US012688529B2

(12) United States Patent
Siu

(10) Patent No.: US 12,688,529 B2
(45) Date of Patent: Jul. 21, 2026

(54) REAL-TIME AUGMENTED REALITY ITEM GUIDE

(71) Applicant: eBay Inc., San Jose, CA (US)

(72) Inventor: Tsun Kwan Donald Siu, Fremont, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/416,785

(22) Filed: Jan. 18, 2024

(65) Prior Publication Data

US 2025/0285171 A1     Sep. 11, 2025

(51) Int. Cl.
*G06Q 30/0601*        (2023.01)
*G06T 19/00*          (2011.01)
(Continued)

(52) U.S. Cl.
CPC ... *G06Q 30/06433* (2025.08); *G06Q 30/0625* (2013.01); *G06T 19/006* (2013.01);
(Continued)

(58) Field of Classification Search
CPC .......... G06Q 30/0206; G06Q 30/0283; G06Q 30/0601–0644; G06T 19/003; G06T 19/006; G06V 10/20; G06V 10/26; G06V 10/40; G06V 10/42–426; G06V 10/44; G06V 10/70; G06V 10/74; G06V 10/752; G06V 10/764; G06V 10/778; G06V 10/82; G06V 20/20; G06V 20/36; G06V 20/50; G06V 20/62; G06V 20/64–653;
(Continued)

(56) References Cited

U.S. PATENT DOCUMENTS 10,459,608 B2    10/2019    Gabbai et al.
10,657,375 B1     5/2020    Edwards et al.
(Continued)

FOREIGN PATENT DOCUMENTS

CN    102385697 A    3/2012
CN    107219920 A    9/2017
KR    101678970 B1   11/2016

OTHER PUBLICATIONS

Jesús Omar Álvarez Márquez and Jürgen Ziegler. 2020. In-Store Augmented Reality-Enabled Product Comparison and Recommendation. 14th ACM Conference on Recommender Systems (RecSys '20). Association for Computing Machinery, New York, NY, USA, 180-189. https://doi.org/10.1145/3383313.3412266 (Year: 2020).*
(Continued)

*Primary Examiner* — William J Allen
(74) *Attorney, Agent, or Firm* — FIG. 1 Patents

(57)            ABSTRACT

A real-time augmented reality item guide is described. A service platform may receive a digital image depicting at least one item. A plurality of listings for the at least one item on the service platform is identified via at least one machine learning model of the service platform based on the digital image, each of the plurality of listings associated with a respective point in time. An aspect is fetched from each of the plurality of listings for the at least one item on the service platform. Time-dependent augmented reality digital content is generated for the at least one item based on the aspect. The time-dependent augmented reality digital content is rendered as an overlay on the digital image.

20 Claims, 6 Drawing Sheets

(51) Int. Cl.

| | |
|---|---|
| *G06V 10/44* | (2022.01) |
| *G06V 10/70* | (2022.01) |
| *G06V 10/764* | (2022.01) |
| *G06V 20/20* | (2022.01) |

(52) U.S. Cl.
CPC .............. *G06V 10/44* (2022.01); *G06V 10/70* (2022.01); *G06V 10/764* (2022.01); *G06V 20/20* (2022.01)

(58) Field of Classification Search
CPC   G06V 20/68; G06V 20/70; G06F 16/50–587; G06F 16/70–7837
See application file for complete search history.

(56)                References Cited

U.S. PATENT DOCUMENTS

| 11,210,731 | B1 * | 12/2021 | Croak | G07G 1/0081 |
|---|---|---|---|---|
| 11,694,440 | B2 | 7/2023 | Jindal et al. | |
| 2005/0080645 | A1 * | 4/2005 | Counts | G06Q 40/04 |
| | | | | 705/37 |
| 2012/0230548 | A1 * | 9/2012 | Calman | G06V 20/56 |
| | | | | 382/104 |
| 2013/0226945 | A1 * | 8/2013 | Swinson | G06F 40/247 |
| | | | | 707/758 |
| 2014/0143073 | A1 * | 5/2014 | Doris-Down | G06Q 30/0601 |
| | | | | 705/16 |
| 2014/0258016 | A1 * | 9/2014 | Hale | G06Q 30/08 |
| | | | | 705/26.7 |
| 2017/0161852 | A1 * | 6/2017 | Takenaka | G06Q 50/10 |
| 2018/0150892 | A1 * | 5/2018 | Waldron | G06Q 30/0631 |
| 2021/0398183 | A1 * | 12/2021 | Jain | G06V 10/82 |
| 2022/0335452 | A1 | 10/2022 | Singh et al. | |
| 2023/0056125 | A1 | 2/2023 | Schneider | |
| 2023/0254455 | A1 | 8/2023 | Zheng et al. | |
| 2024/0005424 | A1 * | 1/2024 | Bhatia | G06Q 30/0643 |
| 2024/0242260 | A1 * | 7/2024 | Shanker | G06Q 30/0631 |
| 2025/0104131 | A1 * | 3/2025 | Padmanabha Rao | G06F 3/048 |
| 2025/0191046 | A1 * | 6/2025 | Kim | G06Q 30/0639 |

OTHER PUBLICATIONS

Brownlee, Jason , "A Gentle Introduction to Object Recognition With Deep Learning", Machine Learning Mastery. Retrieved from the Internet <https://machinelearningmastery.com/object-recognition-with-deep-learning/>, Jan. 27, 2021, 36 pages.

Chen, Steven , et al., "The Price is Right: Predicting Prices with Product Images", Mar. 2018, 6 pages.

Miranda, Brunelli P, et al., "A low-cost multi-user augmented reality application for data visualization", Advances in Multimedia Interaction and Visualization, vol. 81 <1 of2>, Jun. 23, 2021, 29 pages.

Miranda, Brunelli P, et al., "A low-cost multi-user augmented reality application for data visualization", Advances in Multimedia Interaction and Visualization, vol. 81 <2 of2>, Jun. 23, 2021, 29 pages.

* cited by examiner

Figure 5:
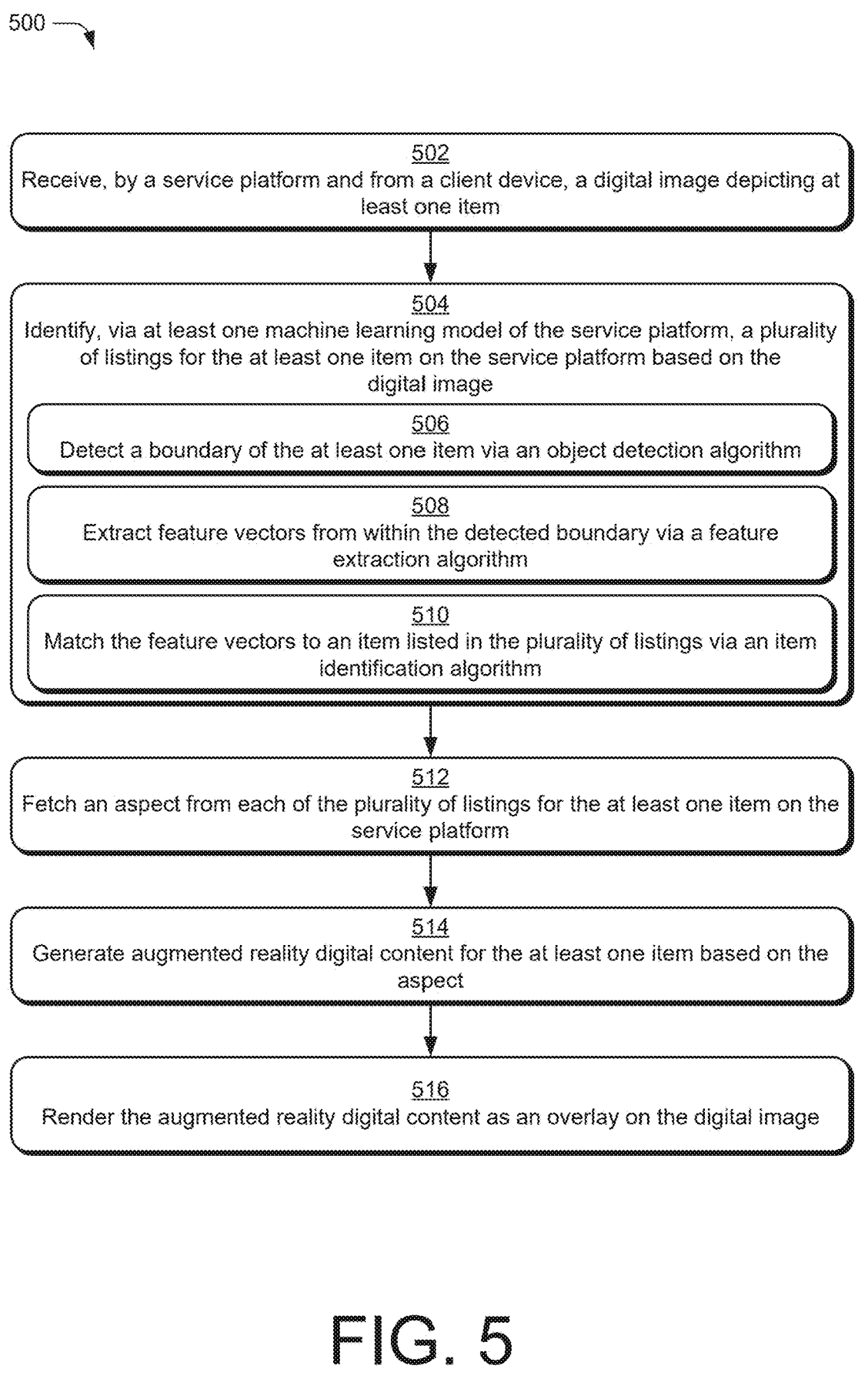

500 ⌐

502
Receive, by a service platform and from a client device, a digital image depicting at least one item

504
Identify, via at least one machine learning model of the service platform, a plurality of listings for the at least one item on the service platform based on the digital image

506
Detect a boundary of the at least one item via an object detection algorithm

508
Extract feature vectors from within the detected boundary via a feature extraction algorithm

510
Match the feature vectors to an item listed in the plurality of listings via an item identification algorithm

512
Fetch an aspect from each of the plurality of listings for the at least one item on the service platform

514
Generate augmented reality digital content for the at least one item based on the aspect

516
Render the augmented reality digital content as an overlay on the digital image

Platform 616

Resources 618

Cloud 614

Computing Device 602

Processing System 604

Hardware Elements 610

Computer-readable Media 606

Memory/ Storage 612

I/O Interfaces 608

Image Augmentation Service 114

REAL-TIME AUGMENTED REALITY ITEM GUIDE

BACKGROUND

Search is a technique via which users of computing devices may locate information of interest. Users, for instance, may enter search queries to locate goods or services of interest or to obtain information about an item. However, conventional search techniques may involve performance of repeated queries or link selections. Moreover, search data retrieval utilizes substantial computing resources and computation power of both a client device associated with the user and a service platform executing the search, which may result in higher search latencies for a plurality of users across the service platform.

SUMMARY

A real-time augmented reality item guide is described. A service platform may receive a digital image depicting at least one item. A plurality of listings for the at least one item on the service platform is identified via at least one machine learning model of the service platform based on the digital image, each of the plurality of listings associated with a respective point in time. An aspect is fetched from each of the plurality of listings for the at least one item on the service platform. Time-dependent augmented reality digital content is generated for the at least one item based on the aspect. The time-dependent augmented reality digital content is rendered as an overlay on the digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 5 is a flow diagram depicting an algorithm as a step-by-step procedure in an example of implementing a real-time augmented reality item guide.

DETAILED DESCRIPTION

Overview

Figure 1:
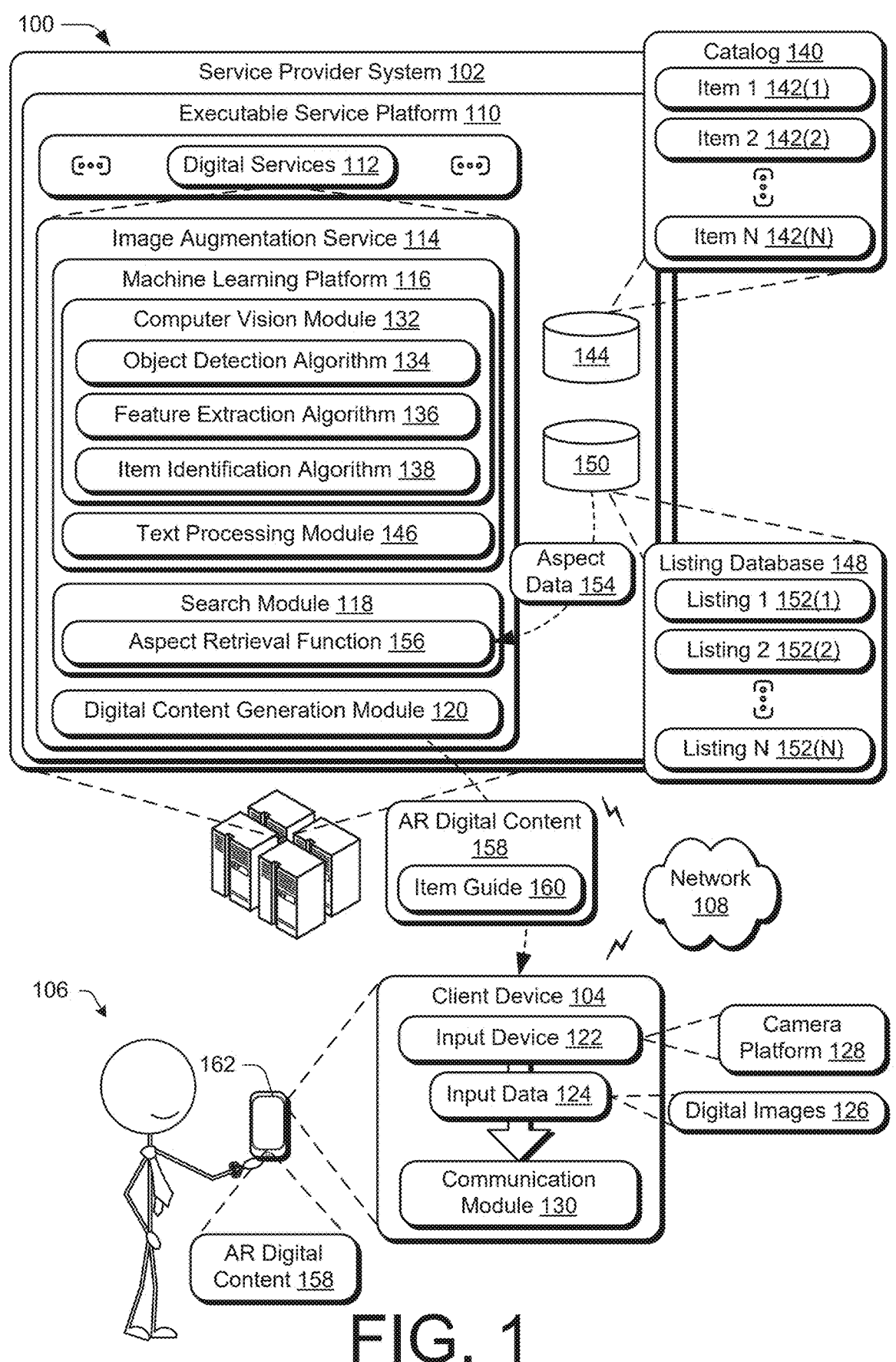
FIG. 1 is an illustration of a digital medium environment in an example implementation that is operable to employ augmented reality techniques described herein.

Advancements in computer vision, machine learning, and object recognition technologies have been used to develop augmented reality (AR) systems that digitally enhance images of a user's physical environment in real-time, such as based on images received via live camera feeds. In the context of item searching, conventional computer vision-based image scanning techniques reduce an amount of information that is manually input by the user and enable a single item to be looked up, e.g., via a listing search of a service platform. However, the user is tasked with reviewing listing results one-by-one. As an example, a user may use a computing device (e.g., a mobile phone) to look up a value of a collectable, such as a trading card game card found at a gaming store, when making purchase decisions. However, this manual search process is time consuming and computing resource-intensive, particularly if the collectable is being offered for sale in a different language and/or currency than the user's native language and/or currency.

Accordingly, a real-time augmented reality item guide is described. This technique supports computing resource-efficient item listing search and aspect retrieval. For example, the techniques described herein enable batch-searching for a plurality of items depicted in a digital image to be performed and provide real-time information for respective items. The real-time augmented reality item guide, for instance, is generated via an image augmentation service that uses machine learning and computer vision techniques to identify an item depicted in the digital image in order to retrieve an aspect (e.g., price data, color data, size data, etc.) from a plurality of listings for the item. The image augmentation service may match the depicted item to an item identifier, such as retrieved by matching the depicted item to a cataloged item, and may further identify the plurality of listings using the item identifier. The real-time augmented reality item guide is generated based on the retrieved aspect and output as an overlay on the digital image. In the context of price, the real-time augmented reality item guide may indicate whether a price depicted in the image is more or less than the price data for the plurality of listings. By retrieving aspects from the listings rather than loading each listing and its associated data individually, a burden on computing resources is reduced.

In this way, a number of repeated inputs used to obtain item aspect information is reduced, which decreases network traffic and makes computing resources available for performing other tasks, resulting in lower response latencies across a service platform. Additionally, by processing the reduced number of inputs, less power is used, thereby increasing device battery life and/or enabling the power to be used for alternative tasks. In this way, the real-time augmented reality item guide described herein improves operation of a computing device. Further discussion of these and other examples is included in the following discussion and shown in corresponding figures.

In some aspects, the techniques described herein relate to a method for an augmented reality guide, the method including: receiving, by a service platform, a digital image depicting at least one item; identifying, via at least one machine learning model of the service platform, a plurality of listings for the at least one item on the service platform based on the digital image, each of the plurality of listings associated with a respective point in time; fetching an aspect from each of the plurality of listings for the at least one item on the service platform; generating time-dependent augmented reality digital content for the at least one item based on the aspect; and rendering the time-dependent augmented reality digital content as an overlay on the digital image.

In some aspects, the techniques described herein relate to a method, wherein the aspect includes at least one of a color, a size, a brand, a model, or a year of release of the at least one item.

In some aspects, the techniques described herein relate to a method, wherein the aspect includes price data, and the method further includes: detecting, via a classifier, a price of the at least one item as depicted in the digital image; and generating the time-dependent augmented reality digital content for the at least one item further based on the detected price.

In some aspects, the techniques described herein relate to a method, wherein the time-dependent augmented reality digital content includes a first visual indicator in response to the detected price being less than an average of the price data or a second visual indicator in response to the detected price being greater than the average of the price data.

In some aspects, the techniques described herein relate to a method, wherein the time-dependent augmented reality digital content includes an indication of the price of the at least one item in a different currency than the detected price.

In some aspects, the techniques described herein relate to a method, wherein the time-dependent augmented reality digital content includes a summary of the price data.

In some aspects, the techniques described herein relate to a method, wherein the summary includes an average price, a highest price, and a lowest price of the plurality of listings.

In some aspects, the techniques described herein relate to a method, wherein identifying, via the at least one machine learning model of the service platform, the plurality of listings for the at least one item on the service platform based on the digital image includes: detecting a boundary of the at least one item based on the digital image; outputting feature vectors of a portion of the digital image within the detected boundary; and matching the feature vectors to an item listed on the service platform via the plurality of listings.

In some aspects, the techniques described herein relate to a method, wherein the at least one machine learning model of the service platform is trained for a category of items that includes the at least one item, and wherein the category of items is received via a user interface.

In some aspects, the techniques described herein relate to a method, wherein the digital image is received as part of a live camera feed.

In some aspects, the techniques described herein relate to a method, further including: receiving a selection of the time-dependent augmented reality digital content; and generating a chart for the aspect with respect to a defined period of time based on aspect data for listings associated with time points within the defined period of time, the defined period of time adjustable based on an input.

In some aspects, the techniques described herein relate to a method, wherein the at least one item includes a plurality of items, and wherein the time-dependent augmented reality digital content is generated for individual items of the plurality of items in parallel.

In some aspects, the techniques described herein relate to a computing device including: a processing system; and a computer-readable storage medium storing instructions that, responsive to execution by the processing system, causes the processing system to perform operations including: displaying a digital image from a live camera feed; determining an item identifier for at least one object depicted in the digital image by processing the digital image using a computer vision module of a service platform; retrieving, based on the item identifier, aspect data from a plurality of listings for the at least one object on the service platform, each of the plurality of listings associated with a respective time point; generating augmented reality digital content for the at least one object based on the aspect data with respect to a specified period of time; and rendering the augmented reality digital content as an overlay on the digital image.

In some aspects, the techniques described herein relate to a computing device, wherein determining the item identifier for the at least one object depicted in the digital image by processing the digital image using the computer vision module of the service platform includes: detecting a boundary of the at least one object in the digital image; outputting feature vectors of a portion of the digital image within the detected boundary; and matching the feature vectors to an item having the item identifier via a similarity measurement, wherein the plurality of listings includes instances of the item having the item identifier listed for sale on the service platform.

In some aspects, the techniques described herein relate to a computing device, wherein generating the augmented reality digital content for the at least one object based on the aspect data with respect to the specified period of time includes: receiving, by the service platform, a selection of the specified period of time; constraining the aspect data to a portion generated within the specified period of time based on the respective time point of an associated listing of the plurality of listings; and generating the augmented reality digital content using the constrained aspect data.

In some aspects, the techniques described herein relate to a computing device, wherein the augmented reality digital content indicates at least one of an average sale price, a highest sale price, a lowest sale price, a purchase profitability, a number sold, a color, a size, a brand, a model, or a year of release of the at least one object within the specified period of time.

In some aspects, the techniques described herein relate to a computer-readable storage medium storing instructions that, responsive to execution by one or more processors, causes the one or more processors to perform operations including: receiving, by a service platform, a digital image from a live camera feed; determining an item identifier for an item depicted in the digital image by processing the digital image via at least one machine learning model of the service platform; retrieving a plurality of listings for the item on the service platform based on the item identifier; fetching aspect data from each of the plurality of listings for the item on the service platform, the aspect data associated with points in time corresponding to respective listings of the plurality of listings; generating time-dependent augmented reality digital content for the item based on the aspect data; and rendering the time-dependent augmented reality digital content as an overlay on the digital image.

In some aspects, the techniques described herein relate to a computer-readable storage medium, wherein determining the item identifier for the item depicted in the digital image by processing the digital image via the at least one machine learning model of the service platform includes: detecting a boundary of the item in the digital image via an object detection algorithm; extracting feature vectors from within the detected boundary via a feature extraction algorithm; and matching the feature vectors to an item having the item identifier via an item identification algorithm and based on a catalog of items, the catalog of items including entries for a plurality of items associated with item identifiers.

In some aspects, the techniques described herein relate to a computer-readable storage medium, wherein the operations further include: selecting the at least one machine learning model of the service platform based at least in part on a category input.

In some aspects, the techniques described herein relate to a computer-readable storage medium, wherein generating the time-dependent augmented reality digital content for the item based on the aspect data includes: generating a chart relating an aspect of the aspect data to time for a defined period of time, the defined period of time adjustable based on an input.

In the following discussion, an example environment is first described that may employ the techniques described herein. Examples of implementation details and procedures are then described which may be performed in the example environment as well as other environments. Performance of the example procedures is not limited to the example environment, and the example environment is not limited to performance of the example procedures.

Example of an Environment

FIG. 1 is an illustration of a digital medium environment 100 in an example implementation that is operable to employ real-time augmented reality item guide techniques described herein. The illustrated environment 100 includes a service provider system 102 and a client device 104 of a user 106 that are communicatively coupled, one to another, via a network 108. Computing devices that implement the service provider system 102 and the client device 104 may be configured in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources, e.g., mobile devices. Additionally, a computing device is also representative of a plurality of different devices, such as multiple servers utilized by a business to perform operations "over the cloud" as illustrated for the service provider system 102 and as described with respect to FIG. 6.

The service provider system 102 includes an executable service platform 110. The executable service platform 110 is configured to implement and manage access to digital services 112 "in the cloud" that are accessible by the user 106 via the client device 104 and the network 108. Thus, the executable service platform 110 provides an underlying infrastructure to manage execution of the digital services 112, e.g., through control of underlying computational resources.

The executable service platform 110 supports numerous computational and technical advantages, including an ability of the service provider system 102 to readily scale resources to address wants of the user 106 as well as other entities. Thus, instead of incurring an expense of purchasing and maintaining proprietary computer equipment for performing specific computational tasks, cloud computing provides the user 106 with access to a wide range of hardware and software resources so long as the client device 104 has access to the network 108.

The digital services 112 can take a variety of forms. Examples of digital services include social media services, document management services, storage services, media streaming services, content creation services, productivity services, digital marketplace services, auction services, and so forth. In the present example, the digital services 112 include an image augmentation service 114. In at least one implementation, the image augmentation service 114 includes functionality for implementing real-time augmented reality (AR) guides for at least one item depicted in a digital image. As used herein, "real-time" or "live" refers to processes that occur substantially instantaneously, without intentional delay. The image augmentation service 114 performs image scanning tasks in order to detect and identify item(s) depicted in a digital image, such as received from a live camera feed from the client device 104, using a machine learning platform 116. As will be elaborated herein, upon recognition of the item(s) via the machine learning platform 116, the image augmentation service 114 retrieves item details using a search module 118 and generates AR content via a digital content generation module 120 based on data retrieved via the search module 118.

The client device 104, for instance, may include an input device 122 that is usable to generate input data 124, such as text via a keyboard, a spoken utterance that is converted to text, a capture of one or more digital images 126 via a camera platform 128, and so forth. The input data 124 is then communicated by a communication module 130 (e.g., a browser or a network-enabled application) to the image augmentation service 114 via the network 108. For example, the user 106 may access and/or interact with the camera platform 128 via the input device 122. The camera platform 128, for instance, may implement a "live view" formed of digital images 126 taken of a physical environment of the client device 104 (e.g., a real-time camera feed) and provide this live view as at least a portion of the input data 124 to the image augmentation service 114. Additional examples of the input data 124 are described herein, e.g., with respect to FIG. 2.

The machine learning platform 116 may utilize one or more machine learning models, including different types of machine learning models where the underlying models are learned using different approaches, such as using supervised learning, unsupervised learning, and/or reinforcement learning. By way of example, these models may include regression models (e.g., linear, polynomial, and/or logistic regression models), classifiers, Bayesian networks, random forest learning, dimensionality reduction algorithms, boosting algorithms, neural networks, deep learning models, and reinforcement learning-based models, to name just a few. To process the digital images 126, the machine learning platform 116 of the image augmentation service 114 includes a computer vision module 132 that includes functionality to perform object detection, object recognition, and classification in order to gain a high-level understanding of the visual information included in the digital images 126. Models and/or algorithms of the computer vision module 132 may be trained via one or a combination of supervised learning (where target output labels are included in the training data), unsupervised learning (where explicit target output labels are not provided in the training data), self-supervised learning (where the computer vision module 132 generates the target output labels from the training data), and semi-supervised learning (where the training data includes a combination of labeled and unlabeled examples).

Thus, the machine learning platform 116 may employ at least one model and/or algorithm that is tuned (e.g., trained) based on inputs to approximate unknown functions and provide a desired output. This may include employing computer functionality to learn from, and make predictions on, known data by analyzing the known data to learn to generate outputs that reflect patterns and attributes of the known data. Once trained, the at least one model and/or algorithm is usable to "understand" novel data, e.g., the digital images 126, by generating data-driven predictions or decisions based on the input data 124.

In the example illustrated in FIG. 1, the computer vision module 132 includes an object detection algorithm 134, a feature extraction algorithm 136, and an item identification algorithm 138. The object detection algorithm 134, for instance, is trained to locate and identify (e.g., classify) one or more objects within the digital images 126, such as based on their shape. For example, the object detection algorithm 134 may be configured to detect a boundary of an object depicted in the digital images 126. The feature extraction algorithm 136 may be trained to identify specific patterns, edges, colors, textures, textual features, or other distinctive visual elements from the one or more objects identified by the object detection algorithm 134. In this context, "extracting" refers to identifying relevant information from the digital images 126 in order to isolate relevant attributes, e.g., "features," which are typically represented as feature vectors that are numerical representations of the input data. For example, the feature extraction algorithm 136 may be configured to output feature vectors for a portion of the digital images 126 within the boundary detected by object detection algorithm 134.

Once the detected object(s) in the digital images 126 are represented as feature vectors, the item identification algorithm 138 uses the feature vectors as input for determining an item identity of the detected object(s). By way of example, the item identification algorithm 138 matches an object detected in the digital images 126 to a known, cataloged item by referencing a catalog 140. In at least one implementation, the catalog 140 is a comprehensive database that provides detailed information about a collection of items, such as coins, stamps, trading cards (e.g., sports cards or a cards of a trading card game), limited edition items, designer items (e.g., watches, purses, etc.), comics, toys, figurines, apparel, or the like. Entries for individual items in the collection may be stored on the executable service platform 110 in the catalog 140 according to an item identifier (ID), which includes a unique code or string of characters (e.g., alphanumeric characters) that enables the associated entry to be identified and referenced. The entries of the catalog 140 are depicted in FIG. 1 as a first item 142(1) (e.g., "item 1"), a second item 142(2) (e.g., "item 2"), and an $n^{th}$ item 142(N) (e.g., "item N"), with ellipses denoting that one or more other items may exist in the catalog 140.

The catalog 140 is shown as being stored in a storage device 144, e.g., a data warehouse of the service provider system 102. Although one catalog 140 is shown, it is to be appreciated that the storage device 144 may store a plurality of catalogs. For instance, respective catalogs of the plurality of catalogs are associated with different collections. By way of example, a first catalog systematically provides information for a first collection of items (e.g., a particular trading card game), and a second catalog systematically provides information for a second collection of items (e.g., watches by a specific designer).

The item identification algorithm 138 may reference the catalog 140 to perform feature vector matching between the feature vectors generated by the feature extraction algorithm 136 and feature vectors of items in the catalog. A "match" in this context thus refers to the feature vectors of the detected object, as output by the feature extraction algorithm 136, being the same as feature vectors for an item in the catalog, such as via a similarity measurement technique. In at least one implementation, the computer vision module 132 includes a plurality of different item identification algorithms that are trained to match items in different catalogs or collections of catalogs stored in the storage device 144. For instance, a first item identification algorithm may be trained to perform feature vector matching for trading cards, a second item identification algorithm may be trained to perform feature vector matching for watches, and so forth. By performing the feature vector match, the item identification algorithm 138 may identify the item ID of the object detected in the digital images 126.

The machine learning platform 116 may further include a text processing module 146 that utilizes natural language processing (NLP) techniques and machine learning models, such as recurrent neural networks (RNNs), transformers, and optical character recognition to detect and understand text (e.g., alphanumerical characters) depicted in the digital images 126. By way of example, the text processing module 146 includes a large language model (LLM) that is initially trained (e.g., pre-trained) on a large corpus of diverse textual data to learn patterns and relationships within the textual data, allowing the text processing module 146 to perform tasks like translation, summarization, and so forth. In at least one implementation, the LLM is further trained (e.g., fine-tuned) using the catalog 140 so that the text processing module 146 is specialized for data that is specific to items in the catalog 140. During the fine-tuning, for instance, weights and parameters of the LLM are adjusted using training data generated from the catalog 140 using one or a combination of supervised learning (where target output labels are included in the training data), unsupervised learning (where explicit target output labels are not provided in the training data), self-supervised learning (where the machine learning platform 116 generates the target output labels from the training data), and semi-supervised learning (where the training data includes a combination of labeled and unlabeled examples). It is to be appreciated that the text processing module 146 may include a plurality of models that perform different specialized tasks (e.g., a first model for language detection, a second model for language translation, a third model for currency conversion, a fourth model for context understanding, etc.) rather than a singular model that performs an entirety of the language processing tasks.

As a non-limiting, illustrative example, the object detection algorithm 134 detects a price tag associated with an object in the digital images 126, e.g., via a price tag classifier. The text processing module 146 detects numerical values included on the detected price tag and further determines a currency of a price shown on the price tag. The text processing module 146 converts the price to a desired currency based on receiving the desired currency as part of the input data 124. The converted price may then be used by the digital content generation module 120 to generate AR digital content, as will be elaborated below.

Once the item identification algorithm 138 identifies the item ID of the object detected in the digital images 126 from the catalog 140, the search module 118 identifies corresponding listings in a listing database 148, which is illustrated as being stored in a storage device 150 (e.g., a data warehouse of the executable service platform 110) using the item ID. In one or more implementations, individual listings for the plurality of listings are stored as entries in the listing database 148 according to a listing identifier (ID), which includes a unique code or string of characters (e.g., alphanumeric characters) that enables the associated listing to be tracked, organized, and managed. The entries of the listing database 148 are depicted in FIG. 1 as a first listing 152(1) (e.g., "listing 1"), a second listing 152(2) (e.g., "listing 2"), and an $n^{th}$ listing 152(N) (e.g., "listing N"), with ellipses denoting that one or more other listings may exist in the listing database 148. It is to be appreciated that individual entries in the listing database 148 include different listing IDs.

In at least one implementation, the search module 118 performs batch-searching of a plurality of items identified in the digital images 126, which reduces computational resources and network traffic compared to searching for the items individually as well as reducing an amount of time performed searching. By way of example, if ten items are identified in the digital images 126, a single search is performed via the search module 118 rather than ten individual queries. In this way, an operating efficiency of the service provider system 102 is increased. Furthermore, power consumption by the client device 104 is decreased by reducing repeated user inputs, which thus improves the operation of the client device 104.

The entries in the listing database 148 include instances of items that have been registered on the executable service platform 110 (e.g., for sale) in order to make the items available to other users, e.g., for purchase. The listing database 148 includes, for example, active listings of items currently available and purchasable by the user 106 as well as inactive listings of items that are no longer available and purchasable by the user 106, such as due to a sale of the item via the listing or an expiration of the listing. It is to be appreciated that multiple listings may exist in the listing database 148 for a specific item, such as when multiple instances of the item are listed for sale on the service provider system 102. In contrast to this, the catalog 140 includes one entry for the specific item.

In accordance with the techniques described herein, in response to receiving the item ID for at least one item depicted in the digital images 126 from the item identification algorithm 138, the search module 118 identifies (e.g., selects) listings of the listing database 148 for the at least one item and fetches aspect data 154 describing one or more aspects from each of the identified listings via an aspect retrieval function 156. Non-limiting examples of aspects include price, size, color, model, brand, designer, year of manufacture or release, issue number, and so forth. The aspect retrieval function 156 includes functionality for extracting aspect data (e.g., as a datafile or list) from the identified listings, which results in a smaller amount of data being transferred (e.g., over the network 108) compared with individually loading the identified listings, such as occurs during a manual search performed by the user 106. Moreover, in at least one implementation, the aspect retrieval function 156 performs batch retrieval for the aspect data 154 for of a plurality of items identified in the digital images 126.

In one or more implementations, the listings in the listing database 148 are each associated with a respective point in time, such as a time at which the corresponding listing was generated or the associated item was sold. As such, the aspect data 154 retrieved from the listing database 148 may be associated with the respective points in time in order to generate time-dependent data. The time-dependence, for example, may account for how an aspect, such as the color or price, of the associated item varies or remains constant (e.g., does not vary) with respect to time. This time-dependence may be used by the digital content generation module 120 based on preferences received via the input data 124, for example.

The aspect data 154 are used by the digital content generation module 120 to generate augmented reality digital content 158 (abbreviated as "AR digital content" in the figures), which is communicated to the client device 104, e.g., via the communication module 130. The augmented reality digital content 158, for instance, may describe aspects of the at least one item, such as a brand name of the at least one item, a price for which the at least one item is available for sale or purchase (e.g., via the service provider system 102), a relative popularity of the at least one item (e.g., based on a number sold during a specified period of time), and so forth, as determined from the aspect data 154. Accordingly, the augmented reality digital content 158 may function as an item guide 160 that provides information regarding the at least one item and/or for purchasing the at least one item. The item guide 160, for instance, may include a price guide that shows how a monetary value of the object has changed with respect to time, as will be further elaborated herein, e.g., with respect to FIG. 4.

To generate the augmented reality digital content 158, the digital content generation module 120 may include functionality for interpreting and/or summarizing the aspect data 154 retrieved from the listing database 148. By way of example, the digital content generation module 120 may be configured to generate an average sold price of the item within a defined time period (e.g., within the last month or the last year), output a number of items sold within the defined time period, and so forth as a summary of the aspect data 154. As such, the augmented reality digital content 158 may be time-dependent and vary as a function of time, e.g., as new data becomes available or data used in generating the digital content becomes out of date. In this context, the augmented reality digital content 158 may include real-time, up-to-date information.

The augmented reality digital content 158 is rendered for display at the client device 104, such as via a display device 162 of the client device 104. In at least one implementation, the augmented reality digital content 158 is rendered as an overlay on the digital images 126. For example, the augmented reality digital content 158 is displayed proximal to the at least one item. In this way, the camera platform 128 supports functionality for the user 106 to "look around" the physical environment and display aspect information that describes objects included within the physical environment. Moreover, the augmented reality digital content 158 may include user-selectable elements that enable different or additional information to be displayed.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Real-Time Augmented Reality Item Guide

Figure 2:
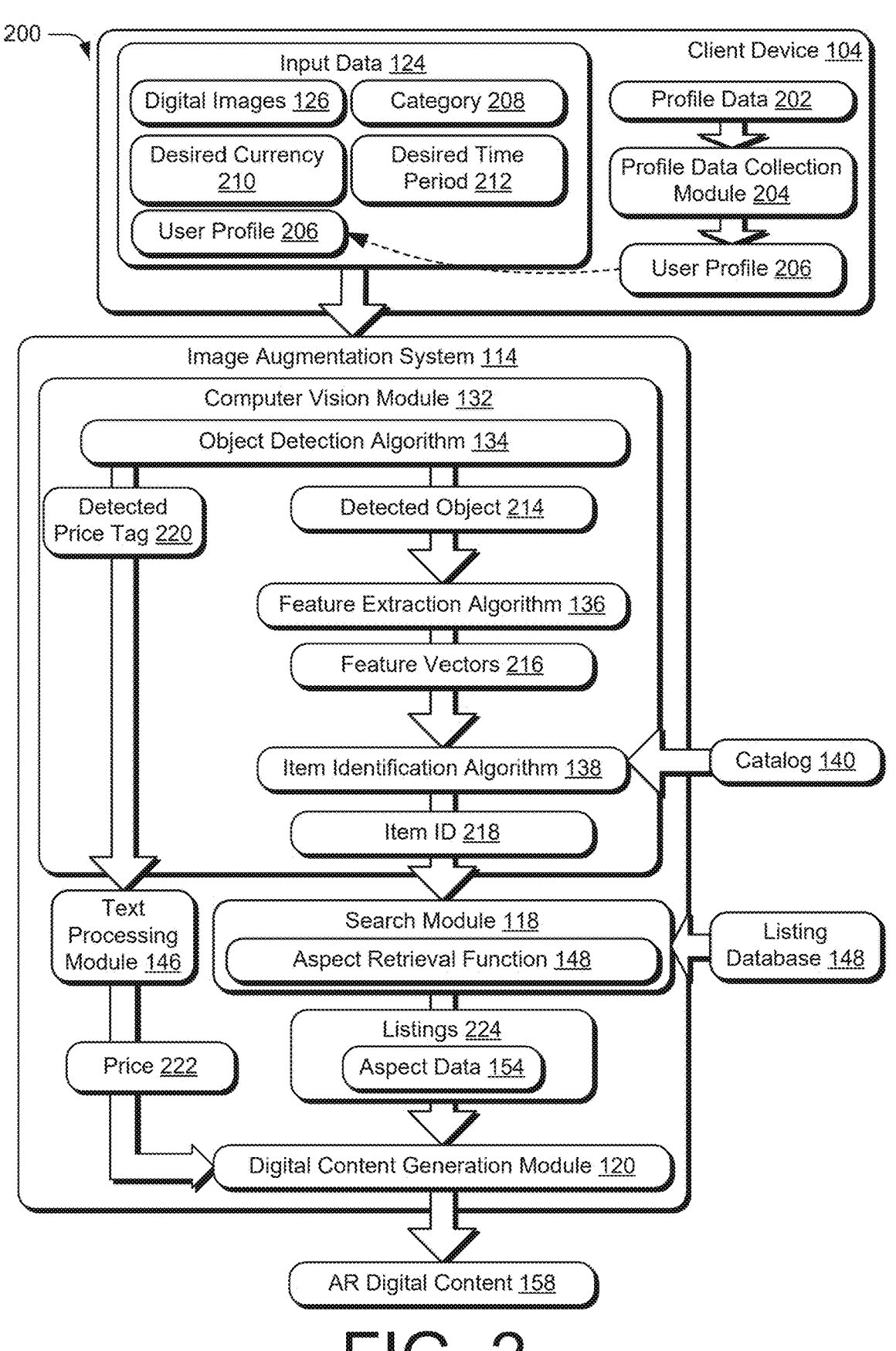
FIG. 2 depicts an example implementation showing operation of the image augmentation service of FIG. 1 in greater detail.

FIG. 2 depicts an example implementation 200 showing operation of the image augmentation service 114 of FIG. 1 in greater detail. The following discussion describes techniques that are implementable utilizing the previously described systems and devices, and thus, where applicable, reference will be made to components previously introduced in FIG. 1.

In the example implementation 200, the client device 104 receives profile data 202 via a profile data collection module 204 to generate a user profile 206. The user profile 206, for instance, includes preferences for customizing information included in the augmented reality digital content 158 and/or the way the information is displayed. For instance, the user profile 206 may include input from the user 106 regarding visualization preferences (e.g., color schemes, text sizes, etc.) as well as aspects to include in the augmented reality digital content 158. Additionally or alternatively, the user profile 206 may include collection data, where the user 106 specifies which items in the catalog 140 are already owned, and/or wish list data, where the user 106 specifies which items in the catalog 140 are desired. Although the user profile 206 is shown as being stored on the client device 104, it is to be appreciated that in other implementations, the user profile 206 is additionally or alternatively stored on the service provider system 102. The profile data collection module 204 may receive the profile data 202 via the input device 122, for example.

The user profile 206 is included in the input data 124 communicated to the image augmentation service 114. As described above with respect to FIG. 1, the input data 124 additionally include the digital images 126, such as obtained via the camera platform 128. In the example implementation 200, the input data 124 further include a category 208, a desired currency 210, and a desired time period 212. The category 208 describes a type of object (or item) that is to be identified via the image augmentation service 114. The desired currency 210 indicates a selected currency in which the user 106 wishes to receive price information, when included, and the desired time period 212 indicates a date and/or time range for constraining the search module 118. That is, search module 118 may retrieve listings associated with timepoints within the desired time period 212 so that aspects from listings associated with timepoints outside of the desired time period 212 are not used in generating the augmented reality digital content 158. It is to be appreciated that additional or alternative inputs may be included in the input data 124 without departing from the scope of the described techniques. Moreover, in at least one implementation, one or more or each of the category 208, the desired currency 210, and the desired time period 212 is included in the user profile 206.

The user 106 may use the input device 122 of the client device 104 to select or otherwise input the category 208, the desired currency 210, and the desired time period 212. In some instances, the category 208, the desired currency 210, and the desired time period 212 may be automatically populated based on a default setting or stored preferences of the user 106 in the user profile 206. The user 106 may further adjust the automatically populated information via the input device 122, as desired.

As an illustrative example, the user 106 may use the input device 122 to select or otherwise input "trading cards" as the category 208 when capturing digital images of trading cards, "USD" as the desired currency 210 when the user 106 wants to view monetary values in United States dollars, and "past month" as the desired time period 212 when the user 106 is interested in trading card sales that have occurred in the previous month. Based on these inputs, the image augmentation service 114 may be configured to identify trading cards in the digital images 126 and generate augmented reality digital content 158 for the trading cards based on listing data associated with points in time within the previous month, with monetary information shown in the augmented reality digital content 158 provided in USD. Accordingly, the category 208, the desired currency 210, and the desired time period 212 may affect how the digital images 126 are processed via the computer vision module 132, how the search is performed by the search module 118, and/or how the augmented reality digital content 158 is generated by the digital content generation module 120.

The image augmentation service 114 receives the input data 124, e.g., from the client device 104 via the communication module 130. In at least one implementation, the computer vision module 132 includes different object detection algorithms 134 and/or different item identification algorithms 138 for different categories, and so the category 208 may instruct the computer vision module 132 regarding which algorithm(s) or catalog(s) to utilize. Additionally or alternatively, the category 208 may instruct the computer vision module 132 to identify objects in the digital images 126 that are included in the given category while ignoring others. As an illustrative example where the category 208 is "watches" and the digital images 126 depict watches among other accessories (e.g., necklaces and earrings), the computer vision module 132 may identify item IDs for the watches and not the other accessories.

The computer vision module 132 performs object detection via the object detection algorithm 134 based on, e.g., the digital images 126 and the category 208. By way of example, the object detection algorithm 134 may use computational logic to detect shapes of objects in the digital images 126 that are consistent with known shapes of objects in the category 208. As a non-limiting example where the category 208 is trading cards, the object detection algorithm 134 may detect trading cards in the digital images 126 based on their rectangular shapes. The object detection algorithm 134 outputs at least one detected object 214, including its detected boundary.

The detected object 214 is further evaluated by the feature extraction algorithm 136 to generate feature vectors 216. By way of example, the feature extraction algorithm 136 evaluates pixels within the detected boundary of the detected object 214 to identify specific patterns, edges, colors, textures, textual features, or other distinctive visual elements, which are extracted as the feature vectors 216.

The item identification algorithm 138 matches the feature vectors 216 to an item in the catalog 140. By way of example, the item identification algorithm 138 may compare the feature vectors 216 with feature vectors for items in the catalog 140 using a similarity measurement. The similarity measurement may use a Euclidean distance, a cosine similarity measurement, and/or a correlation coefficient, for example. For instance, a smaller Euclidean distance may indicate a higher similarity value, and thus a closer match between the feature vectors 216 of the detected object 214 and the item in the catalog 140. Additionally or alternatively, a similarity threshold may be used. By way of example, the similarly measurements for feature vector comparisons between the feature vectors 216 and those for an item in the catalog 140 may be averaged (e.g., as a weighted or non-weighted average), and a match may be identified when the average similarity measurement is greater than a pre-determined similarly threshold. When a match is identified, e.g., when the average similarity measurement is greater than the similarity threshold, an item ID 218 associated with the matching item is retrieved from the catalog 140.

In the example implementation 200, the object detection algorithm 134 further outputs a detected price tag 220. By way of example, the object detection algorithm 134 includes a price tag classifier that is trained to identify price tags on detected objects, such as based on their size, shape, and the content included, such as numerical price. The detected price tag 220 is received by the text processing module 146, which outputs a price 222 in the desired currency 210. In some scenarios, the price 222 is in a different currency than in the detected price tag 220. As such, in at least one implementation, the text processing module 146 identifies a depicted currency in the detected price tag 220 and performs a currency conversion to the desired currency 210 according to a current exchange rate between the depicted currency and the desired currency 210.

The item ID 218 is received by the search module 118, which identifies listings 224 of the listing database 148 for items having the item ID 218 within the desired time period 212. The aspect retrieval function 156 further fetches the aspect data 154 from the listings 224. The aspect data 154 includes information regarding at least one aspect of the item having the item ID 218, as provided in the listings 224. For instance, the at least one aspect may be a size, a color, a sale price, a brand, a model, or a year of release, such as according to a default for the category 208 and/or based on the user profile 206. Because each listing in the listing database 148 is associated with a respective point in time, the aspect data 154 associates the at least one aspect with the respective point in time.

The digital content generation module 120 receives the aspect data 154 and the price 222, when detected, and generates the augmented reality digital content 158 therefrom. The augmented reality digital content 158, for instance, may describe characteristics of the detected and identified object, a brand name of the detected and identified object, a price for which the detected and identified object is available for sale or purchase (e.g., via an online auction), and so forth, based on the particular aspect(s) included aspect data 154. The augmented reality digital content 158 may additionally include recommendations, digital marketing content configured to cause conversion of a product or service, streaming digital media, digital music, search results, links, and so forth. The augmented reality digital content 158 is configured to be displayed proximal to the detected and identified object as an overlay on the digital images 126, for example. In at least one implementation, the augmented reality digital content 158 includes selectable options that are configured to output additional digital content, such as will be elaborated herein with respect to FIG. 4.

In at least one implementation, the digital content generation module 120 additionally uses the input data 124 to customize information included in the augmented reality digital content 158 and/or the way the information is displayed. For instance, the augmented reality digital content 158 may include price information, including the price 222 of the detected price tag 220 and/or a sale price generated from the aspect data 154, in the desired currency 210. Additionally or alternatively, the input data 124 may be used to adjust colors, sounds, and graphics used in the augmented reality digital content 158. Non-limiting examples of how the augmented reality digital content 158 is visually rendered are described below with respect to FIG. 4.

Figure 3:
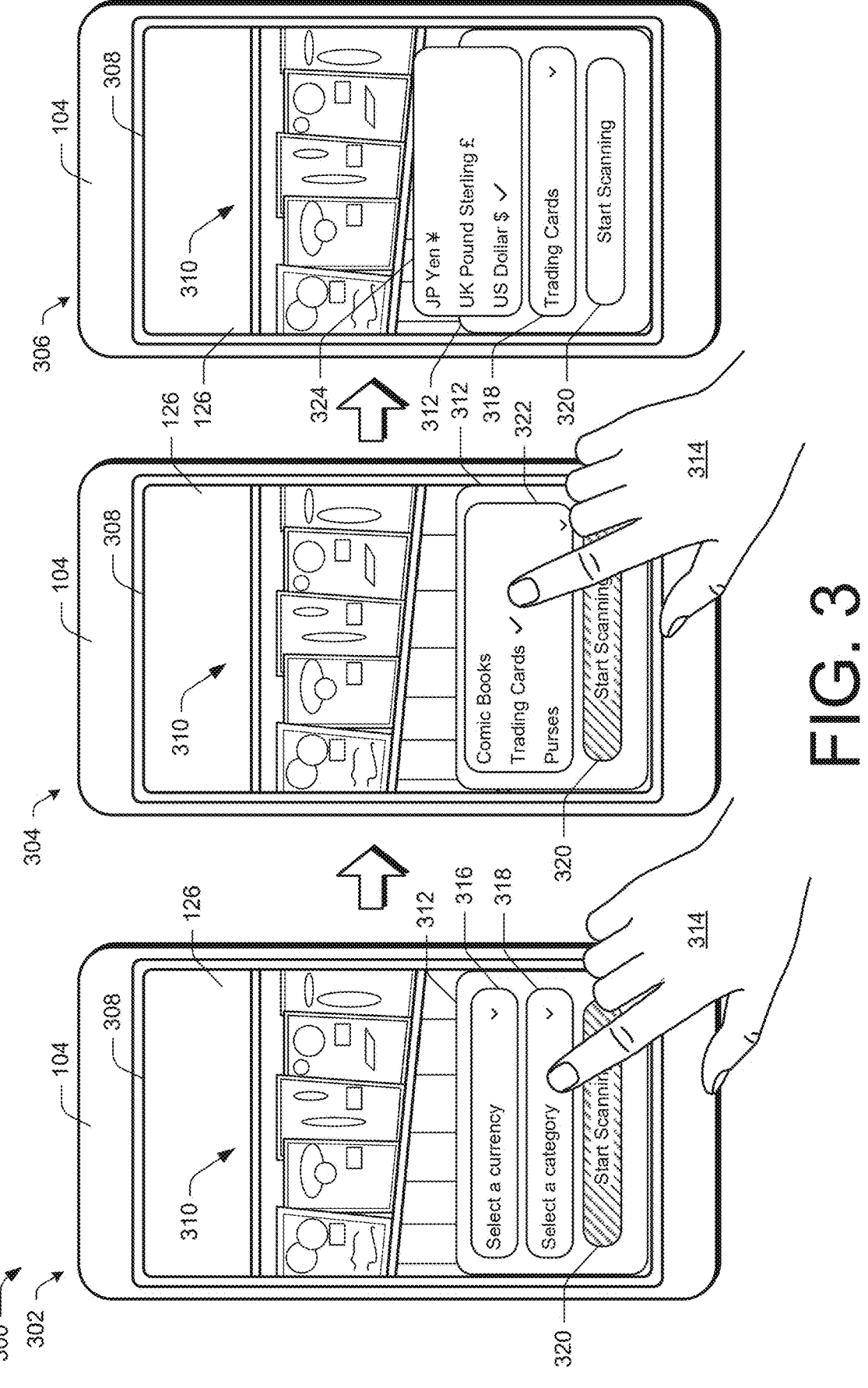
FIG. 3 depicts an example implementation of user interaction with an image augmentation service.

Referring now to FIG. 3, an example implementation 300 of user interaction with the image augmentation service 114 is shown. The example implementation 300 is illustrated using a first stage 302, a second stage 304, and a third stage 306.

The example implementation 300 depicts the client device 104 displaying a user interface 308. In one or more implementations, the user interface 308 is an interface included in a series or sequence of user interfaces output while accessing the image augmentation service 114 via the client device 104, e.g., via the communication module 130 depicted in FIG. 1.

At the first stage 302, the user interface 308 is output by the client device 104, e.g., via the display device 162, which may be a touchscreen display device. By way of example, the touchscreen display device may be configured to both display outputs of the image augmentation service 114 and receive inputs to be used by the image augmentation service 114. As such, the touchscreen display device may be configured as both the display device 162 and the input device 122. The user interface 308 is configured to display a "live feed" of digital images 126 obtained in real-time from the camera platform 128 in this example.

The live feed of the digital images 126 depicts a plurality of objects 310 in a physical environment. In the illustrated example, the plurality of objects 310 are trading cards. The user interface 308 also includes a selection menu 312 that includes prompts for receiving input to the image augmentation service 114. Input is received, for example, via a hand 314 (e.g., a finger of the user 106) interacting with the touchscreen functionality of the client device 104. In variations, the input is additionally or alternatively received via text commands, spoken commands, mouse or joystick movements, keystrokes, buttons, or the like.

At the first stage 302 of the illustrated example, the selection menu 312 includes a currency selection option 316 and a category selection option 318. The currency selection option 316 enables the user 106 to select a desired output currency (e.g., the desired currency 210), while the category selection option 318 enables the user 106 to select a category of the plurality of objects 310, e.g., the category 208. As described above with respect to FIG. 2, the desired currency 210 indicates a currency for displaying monetary or price information, and the category 208 describes a type of object (or item) that is to be identified via the image augmentation service 114. It is to be appreciated that the implementation 300 shows one example of the options that may be included in the selection menu 312, and the selection menu 312 may include additional or different options without departing from the scope of the described techniques.

The selection menu 312 further includes a control element 320. For example, selection of the control element 320 may cause the image augmentation service 114 to perform one or more tasks, such as object identification via the computer vision module 132. In the first stage 302, the control element 320 is diagonally shaded to indicate that the control element 320 is not selectable at the first stage 302. For example, the control element 320 may not be selectable until input is received from the user 106 via the currency selection option 316 and the category selection option 318. Accordingly, the first stage 302 shows the hand 314 interacting with the category selection option 318 via a finger tap. As such, user input is received at the category selection option 318 that selects the category selection option 318 for additional user interaction.

In response to receiving selection of the category selection option 318 at the first stage 302, a category selection menu 322 is opened at the second stage 304. The category selection menu 322 provides selectable options for the category 208, e.g., "comic books," "trading cards," and "purses" in the example shown. In variations, the selectable options include additional or alternative categories to those shown. Moreover, in at least one variation, the selectable options include sub-categories, such as a type of trading card, e.g., a sport or particular trading card game.

At the second stage 304, user input is detected at "trading cards," e.g., via a finger of the hand 314 tapping "trading cards." Selection of "trading cards" is indicated by a check in the present example. Thus, via the category selection menu 322, the image augmentation service 114 receives instructions to generate the augmented reality digital content 158 with respect to trading cards identified in the plurality of objects 310.

The third stage 306 shows a currency selection menu 324. By way of example, the currency selection menu 324 is opened in response to receiving user input at the currency selection option 316. The currency selection menu 324 provides selectable options for the desired currency 210, e.g., "JP yen," "UK pound sterling," and "US dollar" in the example shown. In variations, the selectable options include additional or alternative currencies to those shown. At the third stage 306, user input has been received to select "US dollar," as indicated by a check next to corresponding option. Moreover, the category selection option 318 shows that trading cards remains selected. As such, input has been received at both the currency selection option 316 and the category selection option 318. Accordingly, the control element 320 is selectable at the third stage 306, as indicated by the absence of diagonal shading.

Upon receiving user input at the control element 320, for instance, the image augmentation service 114 may process the digital images 126 via the computer vision module 132 as described above to identify one or more trading cards in the plurality of objects 310. In this example, the processing includes the object detection algorithm 134 detecting trading cards based on their rectangular shape, and the feature extraction algorithm 136 outputs feature vectors 216 for individual trading cards. The item identification algorithm 138 then uses these feature vectors 216 to retrieve the item ID 218 for one or more detected trading cards that have matching entries in the catalog 140. Based on the identified one or more trading cards, the image augmentation service 114 fetches aspect data from the listing database 148 via the search module 118 and the aspect retrieval function 156 and generates augmented reality digital content 158 via the digital content generation module 120, as discussed above and elaborated below with respect to FIG. 4.

Figure 4:
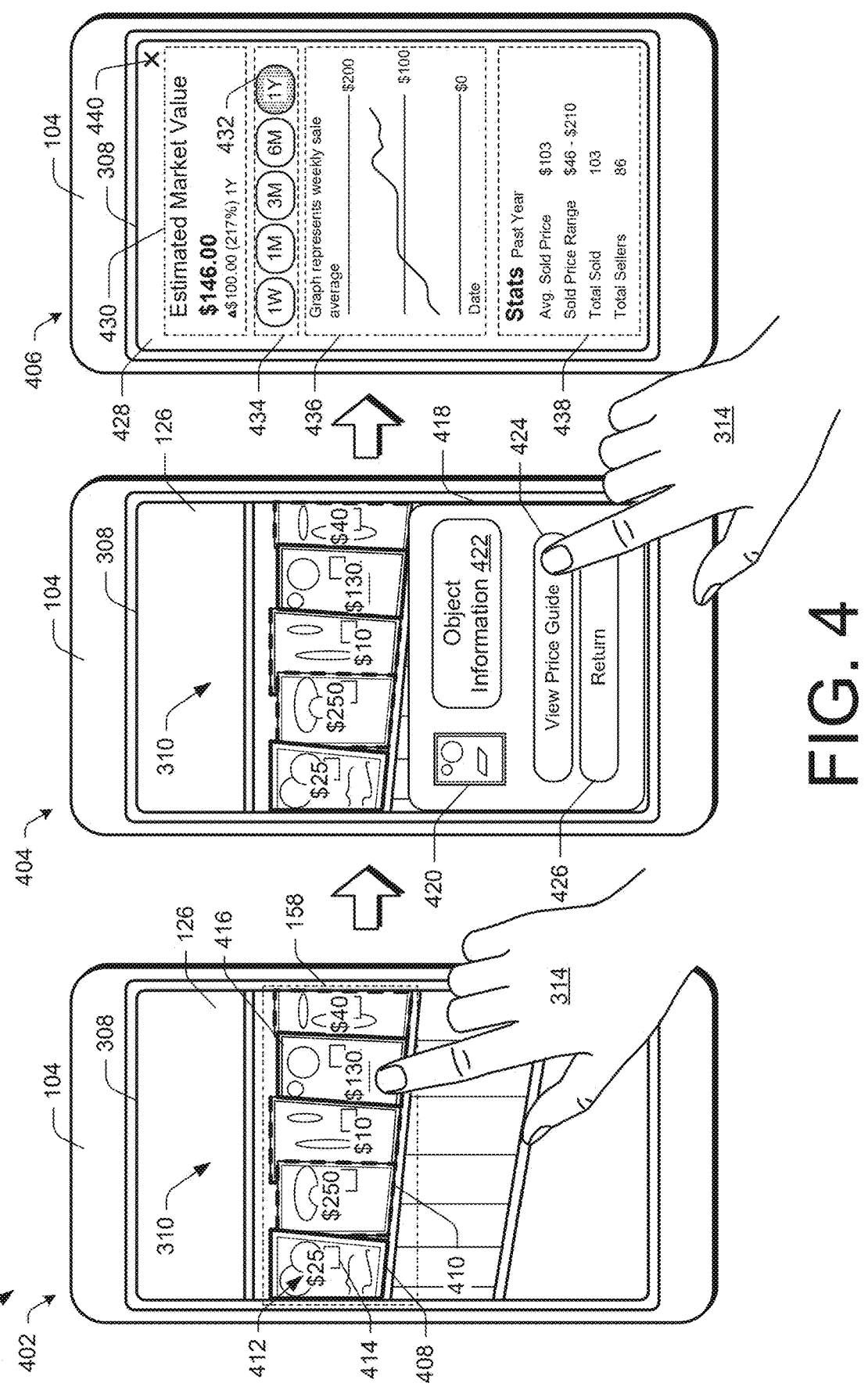
FIG. 4 depicts another example implementation of user interaction with the image augmentation service.

FIG. 4 depicts another example implementation 400 of user interaction with the image augmentation service 114. While FIG. 3 is directed to receiving user inputs for generating the augmented reality digital content 158 by the image augmentation service 114, FIG. 4 depicts user interaction with the augmented reality digital content 158. The example implementation 400 is illustrated using a first stage 402, a second stage 404, and a third stage 406.

The example implementation 400 depicts the client device 104 displaying the user interface 308 introduced above with respect to FIG. 3 displaying the "live feed" of the digital images 126 of the plurality of objects 310. At the first stage 402, the user interface 308 also displays the augmented reality digital content 158. For example, the augmented reality digital content 158 is rendered as an overlay on the digital images 126.

In the illustrated example, the augmented reality digital content 158 includes a plurality of different visual indicators. As a non-limiting example where the augmented reality digital content 158 is related to price (e.g., price is the aspect), the augmented reality digital content 158 includes a first visual indicator 408 for detected and identified trading cards (e.g., individual trading cards that have been matched to an item ID in the catalog 140 by the item identification algorithm 138) where a detected price is less than an average price retrieved from the listing database 148. The first visual indicator 408 is illustrated as a solid bold line around the individual trading card, although other types of visual indications are possible. By way of example, the first visual indicator 408 may additionally or alternatively include a first color, such as green. For illustrative clarity, the first visual indicator 408 is labeled for one trading card in the first stage 402. The augmented reality digital content 158 further includes a second visual indicator 410 for detected and identified trading cards where the detected price is greater than the average price retrieved from the listing database 148. The second visual indicator 410 is illustrated as a bold dashed lined around the individual trading card, although other types of visual indications are possible. By way of example, the second visual indicator 410 may additionally or alternatively include a second color, such as red. For illustrative clarity, the second visual indicator 410 is labeled for one trading card in the first stage 402.

Via the first visual indicator 408 and the second visual indicator 410, information regarding a potential profit or loss of purchasing the detected and identified trading card is quickly and simply conveyed, e.g., to the user 106. This reduces computing resources and network traffic compared to the user 106 searching through a plurality of listings for individual trading cards, which increases an efficiency of the client device 104.

Moreover, the first stage 402 shows the augmented reality digital content 158 as including a price augmentation 412, only one of which is labeled for illustrative clarity. The price augmentation 412 is generated by the image augmentation service 114 in response to detecting a price tag 414 (only one of which is labeled for illustrative clarity) associated with a detected and identified trading card. By way of example, the price tag 414 is identified by the object detection algorithm 134 and evaluated via the text processing module 146 in order to determine the price shown on the price tag 414. Based on the input to the currency selection menu 324 shown in the third stage 306 of FIG. 3, the price augmentation 412 gives the price in USD. It is to be appreciated that the price given on the price tag 414 may be in USD or a different currency.

Although the first stage 402 includes the price augmentation 412 as including the price on the price tag 414, in variations, the price augmentation 412 includes additional or alternative price information. By way of example, the price augmentation 412 may additionally or alternatively include an average sale price (e.g., a sold price and/or currently listed price) of the detected and identified trading card in the identified listings, a highest price of the detected and identified trading card in identified listings, and/or a lowest price of the of the detected and identified trading card in the identified listings. As such, the price augmentation 412 may summarize price data in a variety of ways.

The digital content generation module 120 may configure the augmented reality digital content 158 to remain "as is" relative to the view of the plurality of objects 310, e.g., based on data received from orientation sensors such as accelerometers, inertial devices, a gyroscope, image processing and feature recognition from the digital images, and so forth. Moreover, the digital content generation module 120 may generate the augmented reality digital content 158 for individual items depicted in the digital images 126 in parallel such that the augmented reality digital content 158 is displayed for multiple detected objects at substantially the same time.

Still other information may be included in the augmented reality digital content 158, such as information that does not relate to price. For instance, in at least one implementation, the augmented reality digital content 158 includes a number of current listings for the item ID 218 on the service provider system 102, a number of listings for the item ID 218 that have been sold on the service provider system 102 within a pre-determined timeframe, an average listing duration before a sale occurs, and so forth.

As still another example, the augmented reality digital content 158 may be customized for the user 106 based on the user profile 206. As a non-limiting example, the augmented reality digital content 158 may indicate which of the plurality of objects 310, if any, are currently owned by the user 106 or are on the user 106's wish list based on the user profile 206. For instance, in an alternative example, the first visual indicator 408 indicates items that are on the user 106's wish list, while the second visual indicator 410 indicates items that are not on the user 106's wish list. By including simple visual indications for such information in the augmented reality digital content 158, wish list or collection searching is avoided, which reduces the computing resources uses by the client device 104.

The user interface 308 receives input selecting a trading card 416 at the first stage 402, such as via the finger of the hand 314 tapping the touchscreen at the trading card 416. In response, at the second stage 404, the user interface 308 outputs a menu 418. The menu 418 includes a preview 420 of the trading card 416 as depicted in the catalog 140, for example, as well as object information 422. By way of example, the preview 420 and/or the object information 422 is usable by the user 106 to confirm an accurate identification of the trading card 416 by the image augmentation service 114.

The menu 418 further includes a first control element 424 and a second control element 426. In this example, the first control element 424 is selectable to cause generation of price guide information, whereas the second control element 426 is selectable to return to a previous output of the user interface 308, enabling the user 106 to select a different detected and identified trading card, for example. The second stage 404 shows user input being received at the first control element 424, such as detected using the touchscreen functionality of the client device 104 at the first control element 424.

In response to the user selection of the first control element 424, a price guide 428 is generated in the user interface 308, as shown in the third stage 406. The price guide 428, for instance, provides a detailed breakdown of the price data used to generate the augmented reality digital content 158 and is one example of the item guide 160 described with respect to FIG. 1. In the depicted example, the price guide 428 includes an estimated market value section 430, a date range selection 432 from among a plurality of selectable date range options 434, a price chart 436, and a statistics section 438. The estimated market value section 430 indicates a predicted sale price of the trading card 416, as determined based on the listings 224 retrieved for the date range selection 432 (e.g., the desired time period 212), which is one year in this example. Selection of another of the plurality of selectable date range options 434 may cause at least a portion of the information included in the estimated market value section 430, the price chart 436, and/or the statistics section 438 to change.

The price chart 436 graphically shows a plot of an average sale price of the trading card 416 over time, e.g., over the previous year based on the date range selection 432. The price chart 436 provides information regarding time-dependent price fluctuations, for example. In the depicted example, the statistics section 438 includes an average sold price for the date range selection 432, a sold price range for the date range selection 432, a total number of the trading card 416 sold during the date range selection 432, and a total number of sellers of the trading card 416 during the date range selection 432. It is to be appreciated that the statistics section 438 may include more or different information without departing from the scope of the present disclosure.

The price guide 428 further includes a third control element 440. The third control element 440 is selectable to close the price guide 428 so that the price guide 428 is no longer overlayed on the digital images 126, for example. By way of example, in response to receiving user input selecting the third control element 440, the user interface 308 may return to the second stage 404. In this way, a large amount of information may be generated from the aspect data 154 and output via various stages of the user interface 308 via the augmented reality digital content 158.

Example Procedures

This section describes examples of procedures for a real-time augmented reality item guide. Aspects of the procedures may be implemented in hardware, firmware, software, or a combination thereof. The procedures are shown as a set of blocks that specify operations performed by one or more devices and are not necessarily limited to the orders shown for performing the operations by the respective blocks.

FIG. 5 is a flow diagram depicting an algorithm as a step-by-step procedure 500 in an example of implementing a real-time augmented reality item guide. In at least one implementation, the procedure 500 is performable the image augmentation service 114 as a part of the service provider system 102.

A digital image depicting at least one item is received by a service platform from a client device (block 502). By way of example, the digital image may be captured by a camera platform of the client device (e.g., the camera platform 128 of the client device 104 of FIG. 1) and may be included in a "live view" of a physical environment that includes the at least one item. As such, it is to be appreciated that the digital image may be a sequence of digital images, such as obtained at a frame rate dictated by settings of the camera platform. The client device may communicate the digital image, e.g., the real-time camera feed, to the service platform over a network using a communication module. In at least one variation, however, the digital image is not received from the client device. By way of example, the digital image may be taken from the service platform itself, such as for caching purposes, retrieved from cloud storage, or retrieved from another web service or application.

One or more additional inputs (e.g., in addition to the digital image) may be received by the service platform from the client device. The additional inputs may include, for example, user profile data, a category of the at least one item, a desired currency for displaying monetary information, and a desired time period for data used in generating augmented reality digital content, as will be elaborated below. In at least one variation, the service platform receives the additional inputs from another source that is separate from the client device (e.g., a web service or application) and/or generates the additional inputs based on pre-programmed instructions stored in memory.

A plurality of listings for the at least one item on the service platform is identified via at least one machine learning model based on the digital image (block 504). By way of example, the at least one machine learning model may be learned via one or more learning approaches, such as supervised learning, unsupervised learning, and/or reinforcement learning, and may be trained to perform object detection, object recognition, and/or classification in order to gain a high-level understanding of the visual information included in the digital image. In at least one implementation, the category is used by a machine learning platform to select which at least one machine learning model to use for processing the digital image.

In accordance with the described techniques, identifying the plurality of listings for the at least one item on the service platform based on the digital image includes detecting a boundary of the at least one item via an object detection algorithm (block 506). By way of example, the object detection algorithm (e.g., the object detection algorithm 134 introduced in FIG. 1) may be trained to locate and identify (e.g., classify) the at least one item depicted in the digital image, such as based on shape. For example, the object detection algorithm may be configured to detect a boundary of the at least one item in the digital image. Separate boundaries may be detected for individual items of the at least one item, for instance.

Identifying the plurality of listings for the at least one item on the service platform based on the digital image further includes extracting feature vectors from within the detected boundary via a feature extraction algorithm (block 508). By way of example, the feature extraction algorithm (e.g., the feature extraction algorithm 136 introduced in FIG. 1) may be trained to identify specific patterns, edges, colors, textures, textual features, and/or other distinctive visual elements of the at least one item depicted in the digital image and detected by the object detection algorithm. The feature vectors extracted by the feature extraction algorithm are numerical representations of the visual elements within the detected boundary for the at least one item. For example, the feature extraction algorithm may output separate feature vectors for individual items of the at least one item based on pixels within respective boundaries.

Identifying the plurality of listings for the at least one item on the service platform based on the digital image further includes matching the feature vectors to an item listed in the plurality of listings via an item identification algorithm (block 510). By way of example, the item identification algorithm (e.g., the item identification algorithm 138 introduced in FIG. 1) matches the feature vectors of the at least one item to a cataloged item having an item identifier (e.g., the item ID 218 of FIG. 2), and a search module (e.g., the search module 118 introduced in FIG. 1) identifies the plurality of listings from a listing database using the item identifier. The item identification algorithm, for instance, may compare the feature vectors with feature vectors for cataloged items using a similarity measurement that indicates a degree of similarity. The similarity measurement may use a Euclidean distance, a cosine similarity, and/or a correlation coefficient, for example.

When a match is identified, e.g., an average similarity measurement is greater than a similarity threshold, the item identifier associated with the matching cataloged item is used by the search module to identify the plurality of listings for the at least one item. The plurality of listings includes one or a combination of active listings for the at least one item on the service platform and inactive listings for the at least one item, e.g., listings that are no longer accessible on the service platform. Each of the plurality of listings is associated with a respective point in time. For instance, the point in time may be a time at which the listing was created, a time at which the listing became inactive, or the like. In examples where the input data includes a desired time period, the identified plurality of listings may be constrained to those having associated time points within the desired time period.

An aspect is fetched from each of the plurality of listings for the at least one item on the service platform (block 512). By way of example, the search module includes an aspect retrieval function (e.g., the aspect retrieval function 156 introduced in FIG. 1) for fetching aspect data regarding the aspect from each of the plurality of listings in bulk. Non-limiting examples of aspects include price, size, color, model, brand, designer, year of manufacture or release, issue number, and so forth. It is to be appreciated that aspect data for more than one aspect may be retrieved, such as according to preferences stored in the user profile. As such, the aspect data retrieved from the plurality of listings may be associated with the respective points in time in order to generate time-dependent data. The time-dependence, for example, may account for how an aspect, such as the color or price, of the at least one item varies or remains constant with respect to time.

Augmented reality digital content is generated for the at least one item based on the aspect (block 514). By way of example, a digital content generation module (e.g., the digital content generation module 120 of FIG. 1) receives the aspect data and generates the augmented reality digital content (e.g., the augmented reality digital content 158 introduced in FIG. 1) to provide information regarding the aspect. The augmented reality digital content, for instance, may describe a brand name of the at least one item, a price for which the at least one item is available for sale or purchase (e.g., via the service provider system 102 of FIG. 1), a relative popularity of the at least one item (e.g., based on a number sold during a specified period of time), and so forth, as determined from the aspect data. Accordingly, the digital content generation module may include functionality for interpreting and/or summarizing the aspect data.

In at least one implementation, the augmented reality digital content varies as a function of time, e.g., as new data becomes available or data used in generating the digital content becomes out of date. In this context, the augmented reality digital content includes real-time, up-to-date information, and the augmented reality digital content is time-dependent. The augmented reality digital content, for instance, may include a price guide that shows how a monetary value of the object has changed with respect to time. As such, the augmented reality digital content may function as an item guide that provides information regarding the at least one item and/or for purchasing the at least one item.

The augmented reality digital content is rendered as an overlay on the digital image (block 516). By way of example, the augmented reality digital content may be broadcast for display at the client device via a user interface and a display device. In at least one variation, the augmented reality digital content is additionally or alternatively rendered at a different device, such as at the service platform itself or at another networked device. The augmented reality digital content may be displayed proximal to the at least one item. In this way, the camera platform enables a user to "look around" the physical environment and display aspect information that describes objects (e.g., the at least one item) included within the physical environment. Moreover, in one or more implementations, the augmented reality digital content includes selectable elements that enable user interaction with the augmented reality digital content. Input received via the selectable elements may cause different or additional information to be displayed, for example.

Example System and Device

Figure 6:
FIG. 6 illustrates an example system including various components of an example device that can be implemented as any type of computing device as described and/or utilized with reference to FIGS. 1-5 to implement embodiments of the techniques described herein.

FIG. 6 illustrates an example of a system generally at 600 that includes an example of a computing device 602 that is representative of one or more computing systems and/or devices that may implement the various techniques described herein. This is illustrated through inclusion of the image augmentation service 114. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically executable instructions.

The computer-readable media 606 is illustrated as including memory/storage 612. The memory/storage 612 represents memory/storage capacity associated with one or more computer-readable media. The memory/storage 612 may include volatile media (such as random-access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information thereon, such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method for an augmented reality guide, the method comprising:
   receiving, by a service platform, a digital image of a plurality of digital images comprising a live stream, the digital image depicting at least one item;
   identifying, via at least one machine learning model of the service platform, a plurality of listings for the at least one item on the service platform by:

detecting a boundary of the at least one item based on the digital image;
   outputting feature vectors corresponding to at least a portion of the digital image within the boundary; and
   matching the feature vectors to the at least one item in the plurality of listings, wherein the plurality of listings is associated with respective points in time;
   fetching at least one respective aspect from the plurality of listings for the at least one item on the service platform;
   generating time-dependent augmented reality digital content for the at least one item based on the at least one respective aspect;
   receiving data from one or more orientation sensors, wherein the data corresponds to a view of the at least one item in the live stream of the plurality of digital images; and
   rendering, for display via a user interface and based on the data, the time-dependent augmented reality digital content as an overlay on the live stream, wherein the time-dependent augmented reality digital content remains as is relative to the view of the at least one item in the live stream of the plurality of digital images.

2. The method of claim 1, wherein the at least one respective aspect comprises at least one of a color, a size, a brand, a model, or a year of release of the at least one item.

3. The method of claim 1, wherein the at least one respective aspect comprises price data, and wherein the method further comprises:
   detecting, via a classifier, a price of the at least one item as depicted in the digital image; and
   generating the time-dependent augmented reality digital content for the at least one item further based on the detected price.

4. The method of claim 3, wherein the time-dependent augmented reality digital content comprises a first visual indicator in response to the detected price being less than an average of the price data or a second visual indicator in response to the detected price being greater than the average of the price data.

5. The method of claim 3, wherein the time-dependent augmented reality digital content comprises an indication of the price of the at least one item in a different currency than the detected price.

6. The method of claim 3, wherein the time-dependent augmented reality digital content includes a summary of the price data.

7. The method of claim 6, wherein the summary comprises an average price, a highest price, and a lowest price of the plurality of listings.

8. The method of claim 1, wherein the time-dependent augmented reality digital content indicates a change in the at least one respective aspect over a period of time based on the respective points in time.

9. The method of claim 1, wherein the at least one machine learning model of the service platform is trained for a category of items that includes the at least one item, and wherein the category of items is received via the user interface.

10. The method of claim 1, further comprising:
   receiving a selection of the time-dependent augmented reality digital content; and
   generating a chart for the at least one respective aspect with respect to a defined period of time based on aspect data for listings associated with time points within the defined period of time, the defined period of time adjustable based on an input.

11. The method of claim 1, wherein the at least one item comprises a plurality of items, and wherein the time-dependent augmented reality digital content is generated for individual items of the plurality of items in parallel.

12. The method of claim 1, wherein the digital image is received from a device, wherein the one or more orientation sensors comprise at least one of an accelerometer, an inertial device, or a gyroscope, and wherein the time-dependent augmented reality digital content remains as is relative to the view of the at least one item based on the data indicating a change in orientation of the device.

13. A computing device comprising:
a processing system; and
a computer-readable storage medium storing instructions that, responsive to execution by the processing system, causes the processing system to perform operations comprising:
    receiving, by a service platform, a digital image of a plurality of digital images comprising a live stream, the digital image depicting at least one item;
    identifying, via at least one machine learning model of the service platform, a plurality of listings for the at least one item on the service platform by:
        detecting a boundary of the at least one item based on the digital image;
        outputting feature vectors corresponding to at least a portion of the digital image within the boundary; and
        matching the feature vectors to the at least one item in the plurality of listings, wherein the plurality of listings is associated with respective points in time;
    fetching at least one respective aspect from the plurality of listings for the at least one item on the service platform;
    generating time-dependent augmented reality digital content for the at least one item based on the at least one respective aspect;
    receiving data from one or more orientation sensors, wherein the data corresponds to a view of the at least one item in the live stream of the plurality of digital images; and
    rendering, for display via a user interface and based on the data, the time-dependent augmented reality digital content as an overlay on the live stream, wherein the time-dependent augmented reality digital content remains as is relative to the view of the at least one item in the live stream of the plurality of digital images.

14. The computing device of claim 13, wherein the at least one respective aspect comprises at least one of a color, a size, a brand, a model, or a year of release of the at least one item.

15. The computing device of claim 13, wherein the at least one respective aspect comprises price data, and wherein the operations further comprise:
    detecting, via a classifier, a price of the at least one item as depicted in the digital image; and
    generating the time-dependent augmented reality digital content for the at least one item further based on the detected price.

16. The computing device of claim 13, wherein the time-dependent augmented reality digital content indicates a change in the at least one respective aspect over a period of time based on the respective points in time.

17. A computer-readable storage medium storing instructions that, responsive to execution by one or more processors, causes the one or more processors to perform operations comprising:
    receiving, by a service platform, a digital image of a plurality of digital images comprising a live stream, the digital image depicting at least one item;
    identifying, via at least one machine learning model of the service platform, a plurality of listings for the at least one item on the service platform by:
        detecting a boundary of the at least one item based on the digital image;
        outputting feature vectors corresponding to at least a portion of the digital image within the boundary; and
        matching the feature vectors to the at least one item in the plurality of listings, wherein the plurality of listings is associated with respective points in time;
    fetching at least one respective aspect from the plurality of listings for the at least one item on the service platform;
    generating time-dependent augmented reality digital content for the at least one item based on the at least one respective aspect;
    receiving data from one or more orientation sensors, wherein the data corresponds to a view of the at least one item in the live stream of the plurality of digital images; and
    rendering, for display via a user interface and based on the data, the time-dependent augmented reality digital content as an overlay on the live stream, wherein the time-dependent augmented reality digital content remains as is relative to the view of the at least one item in the live stream of the plurality of digital images.

18. The computer-readable storage medium of claim 17, wherein the at least one respective aspect comprises price data, and wherein the operations further comprise:
    detecting, via a classifier, a price of the at least one item as depicted in the digital image; and
    generating the time-dependent augmented reality digital content for the at least one item further based on the detected price.

19. The computer-readable storage medium of claim 18, wherein the time-dependent augmented reality digital content comprises a first visual indicator in response to the detected price being less than an average of the price data or a second visual indicator in response to the detected price being greater than the average of the price data.

20. The computer-readable storage medium of claim 17, wherein the operations further comprise:
    receiving a selection of the time-dependent augmented reality digital content; and
    generating a chart for the at least one respective aspect with respect to a defined period of time based on aspect data for listings associated with time points within the defined period of time, the defined period of time adjustable based on an input.

\* \* \* \* \*